United States Patent

MacLellan et al.

[11] Patent Number: 5,929,779
[45] Date of Patent: Jul. 27, 1999

[54] READ/WRITE PROTOCOL FOR RADIO FREQUENCY IDENTIFICATION TAGS

[75] Inventors: John Austin MacLellan, Freehold; David Harry Smithgall, East Windsor, both of N.J.

[73] Assignee: Lucent Technologies Inc., Murray Hill, N.J.

[21] Appl. No.: 08/866,934

[22] Filed: May 31, 1997

Related U.S. Application Data

[60] Provisional application No. 60/018,634, May 31, 1996.
[51] Int. Cl.$^6$ .................................................. H04Q 5/22
[52] U.S. Cl. ............................... 340/825.54; 340/825.34; 340/825.31
[58] Field of Search .............................. 340/825.34, 572, 340/573, 825.54, 825.31, 825.69, 825.72; 342/44, 51, 50; 455/54.1, 54.2, 38.2, 73, 106, 517

[56] References Cited

U.S. PATENT DOCUMENTS 5,649,295  7/1997  Shober et al. .......................... 455/38.2

*Primary Examiner*—Michael Horabik
*Assistant Examiner*—Jean B. Jeanglaude
*Attorney, Agent, or Firm*—Samuel R. Williamson; Daniel J. Piotrowski

[57] ABSTRACT

In a radio frequency identification communication system, a communication protocol advantageously controls communication between an interrogator and one or more identifying labels or read/write tags. This protocol is configurable in two modes in which a read/write tag can be expected to operate. In the first mode, a rapid transfer of a limited amount of data takes place between the interrogator and one or more tags. In the second mode, a slower or less time critical transfer of a large quantity of data in a packet format takes place. In this second mode, a communication to the other tags causes these tags to remain "silent" so that they do not corrupt the data transfer in progress. The interrogator automatically determines the quantity of data and the correct mode in which to operate. Either mode can be initiated on successive communication periods by the communication protocol. The data transfer may occur either from the interrogator to a tag or multiple tags, or from a selected tag or multiple tags to the interrogator. The protocol allows either mode to be executed interchangeably. A downlink synchronization signal is transmitted from the interrogator to the tag at regular intervals with a portion of the synchronization signal being used to control the subsequent data transfer mode.

15 Claims, 4 Drawing Sheets

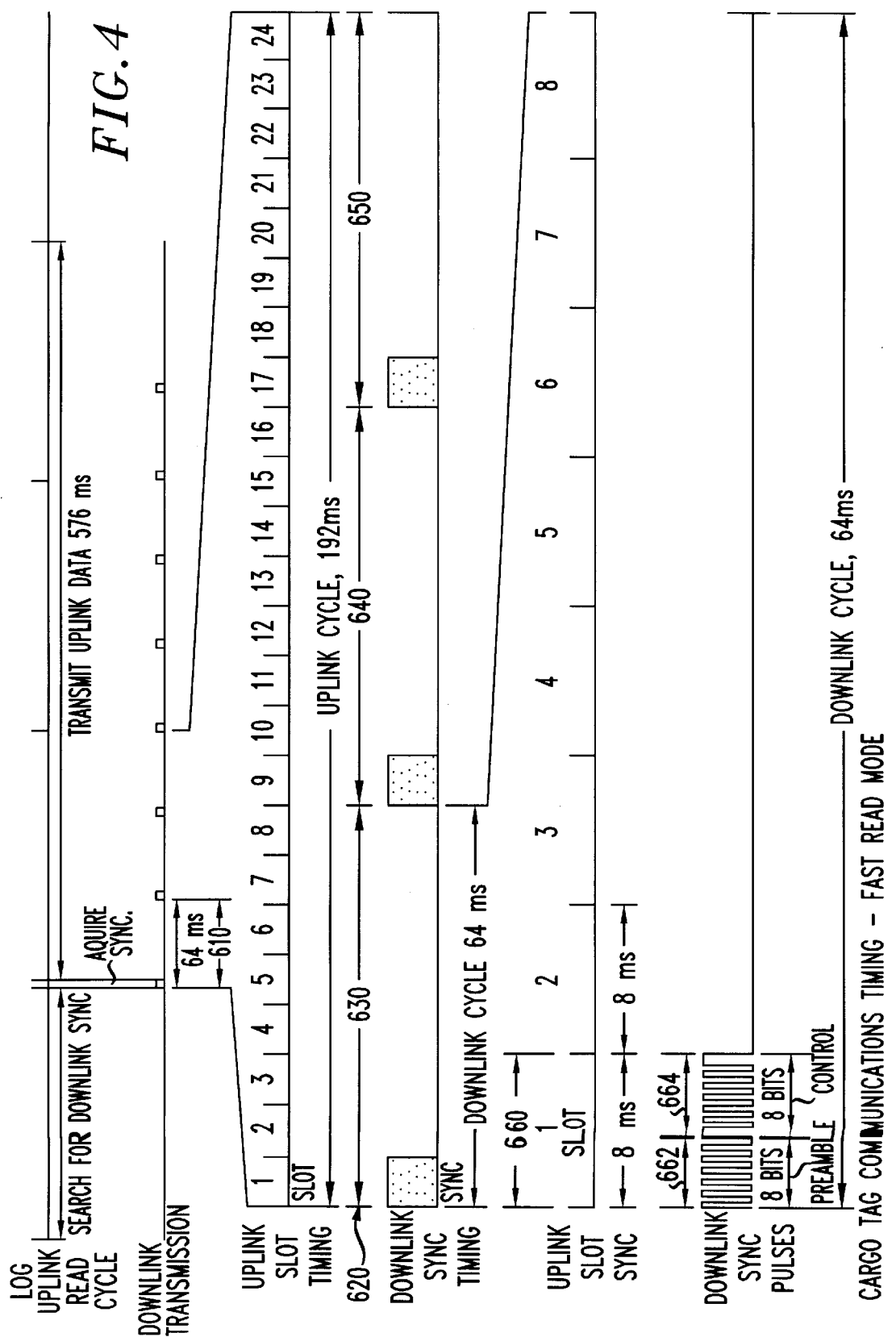

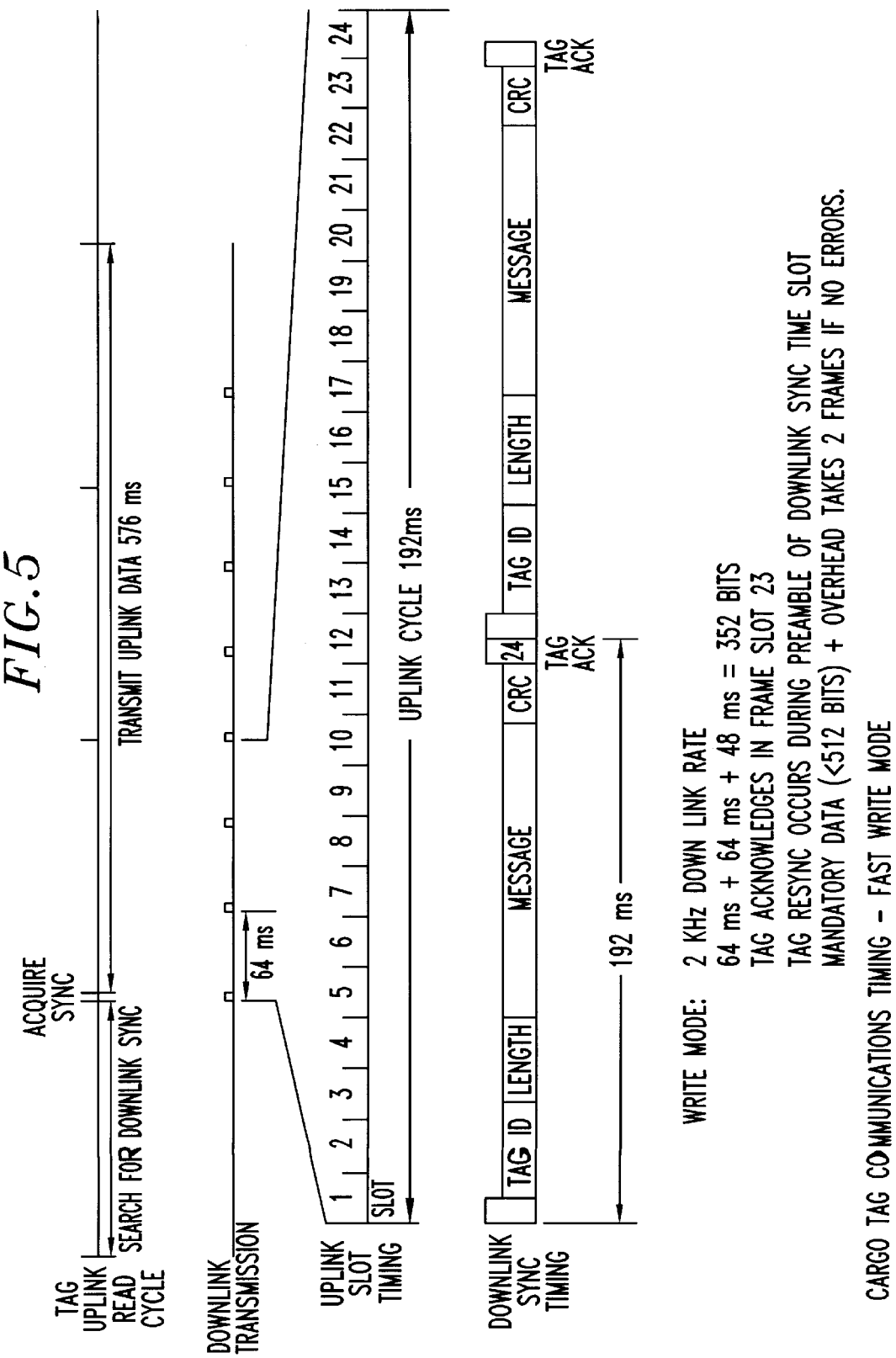

READ/WRITE PROTOCOL FOR RADIO FREQUENCY IDENTIFICATION TAGS

RELATED APPLICATIONS

This application claims the benefit of Provisional Application Ser. No. 60/018,634 filed on May 31, 1996 and entitled "Read/Write Protocol for Radio Frequency Identification tags." Also, related subject matter is disclosed in the following applications assigned to the same Assignee hereof: U.S. patent application Ser. No. 08/775,694, entitled "QPSK Modulated Backscatter System", and U.S. patent application Ser. No. 08/492173, entitled "Dual Mode Modulated Backscatter System."

FIELD OF THE INVENTION

This invention relates to wireless communication systems and, more particularly, to a means of exchanging data between an identifying label or tag and an interrogator in a modulated backscatter radio frequency identification communication system.

BACKGROUND OF THE INVENTION

Radio Frequency identification (RFID) systems are used for identification and/or tracking of equipment or inventory such as pallets, trucks, dollies or boxes or even the whereabouts of some animinals, such as livestock incertain situations. RFID systems are radio communication systems in which communications is provided between a radio transceiver, or interrogator, and a number of small, identifying labels or tags. These tags are read while in the radiation pattern or field of the interrogator, which is connected to a computer-based tracking system. The intent of an RFID system is to provide a reliable and secure architecture that meets a predetermined performance requirement, while minimizing the cost of the interrogator and the tags. In the operation of RFID systems, the interrogator transmits to the tags using modulated radio signals, and the tags respond by transmitting modulated radio signals back to the interrogator. Specifically, the interrogator first transmits an amplitude modulated signal to the tag. Next, the interrogator transmits a continuous-wave (CW) radio signal to the tag. The tag then modulates the CW signal using modulated back scattering (MBS) wherein the antenna is electrically switched, by the tag's modulating signal, from being an absorber of RF radiation to being a reflector of RF radiation; thereby encoding the tag's information onto the CW radio signal. The interrogator demodulates the incoming modulated radio signal and decodes the tag's information message.

The tags may be used in time-critical applications where a short message or small amount of information must be exchanged between the interrogator and the tags. One example of a time-critical application is where the tag, or multiple tags, appear within the field of the interrogator for a short period of time. When the small amounts of information must be exchanged, multiple tags easily may be read while within the field of the interrogator. When large amounts of information must be exchanged, however, generally only one tag may be read while within the field of the interrogator. Thus, it is desirable to be able to selectively exchange data between a designated tag and the interrogator. In addition, it is desirable to be able to periodically communicate with other tags which reside in the field or enter the field while the long data transfer with a tag is ongoing so that these other tags do not corrupt the data transfer in progress.

SUMMARY OF THE INVENTION

In a radio frequency identification (RFID) communication system, a communication protocol advantageously controls communication between an interrogator and one or more identifying labels or read/write tags. In accordance with the invention, this protocol is configurable for two modes in which a read/write tag can be expected to operate. In the first mode, a rapid transfer of a limited amount of data takes place between the interrogator and one or more tags. In the second mode, a slower or less time critical transfer of a large quantity of data in a packet format takes place. In this mode, a communication to the other tags causes these tags to remain "silent" so that they do not corrupt the data transfer in progress. The interrogator automatically determines the quantity of data and the correct mode in which to operate. Either mode can be initiated on successive communication periods by the communication protocol. The data transfer may occur either from the interrogator to a tag or multiple tags, or from a selected tag or multiple tags to the interrogator. The protocol allows either mode to be executed interchangeably. The interrogator transmits a downlink synchronization (sync) signal, from the interrogator to the tag, at regular intervals with a portion of the sync signal being used to control the subsequent data transfer mode.

BRIEF DESCRIPTION OF THE INVENTION

The invention and its mode of operation will be more clearly understood from the following detailed description when read with the appended drawing in which.

Figure 1:
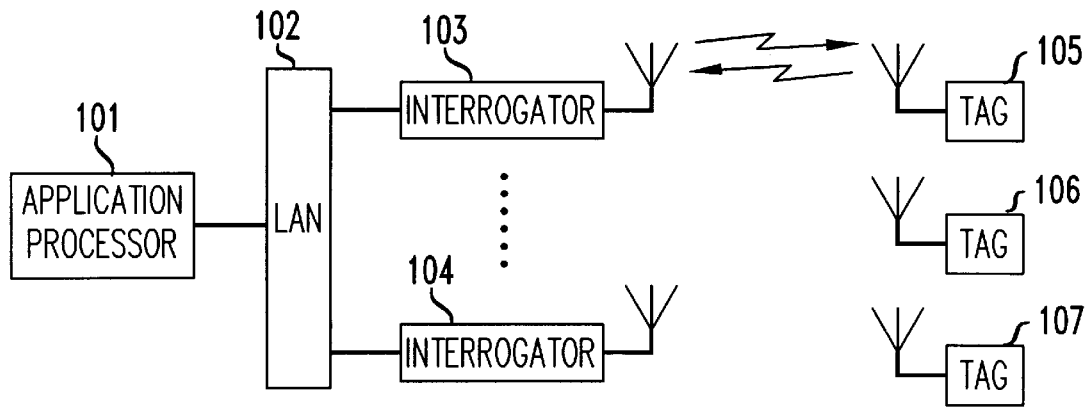
FIG. 1 is shows a block diagram of an illustrative radio frequency identification (RFID) system.

FIG. 4 shows a timing diagram illustrating the operation of a communication protocol in providing communications between the interrogator unit and the tags in the radio frequency identification system, in accordance with the invention; and FIG. 5 shows a timing diagram for illustrating the operation of the communication protocol and the format of the message in providing communications between the interrogator and the tags in the radio frequency identification system, in accordance with the invention.

Throughout the drawing, the same element when shown in more than one figure is designated by the same reference numeral.

DETAILED DESCRIPTION

Referring now to FIG. 1, there is shown an overall block diagram of an illustrative radio frequency identification (RFW) system useful for describing the application of the present invention. An application processor 101 communicates over a local area network (LAN) 102 to a plurality of interrogators 103–104. Each of the interrogators may communicate with one or more of read/write tags 105–107. For example, the interrogator 103 may receive an information signal, typically from an application processor 101, for one of the tags 105–107. The interrogator 103 takes this information signal and processor 200, shown in FIG. 2, properly formats a downlink message (information signal 200a) to be sent to the designated tag.

One class of RFID applications involves using RFID technology to read information from a tag affixed to a container or pallet. Such an application is set forth in IATA Recommended Practice RP 1640, International Air Transport Association Cargo Services Conference Resolutions Manual, 16th Edition, Oct. 1, 1993. In this application, the container is moved across the reading field of an interrogator, which is that volume of space wherein successful communications between the tag and the interrogator can take place. While the tag is in the reading field, the interrogator and tag must complete their information exchange before the tag moves out of the interrogation field. Since the tag often may be moving quickly through the reading field, the RFID system may have only a limited amount of time to successfully complete the transaction. In accordance with the invention, a communication protocol advantageously controls communication between the interrogator and one or more tags for effectively reading of these tags.

The communication protocol is configurable in two modes in which a read/write tag can be expected to operate. In the first mode, a rapid transfer of a limited amount of data takes place between the interrogator and one or more tags. In the second mode, a slower or less time critical transfer of a large quantity of data in a packet format takes place.

With reference to the first mode in greater detail, this mode is a rapid data transfer mode where the entire message is transmitted before the next downlink sync burst. In a first illustration of the operation of this first mode, one or more tags responds to the interrogator with a burst of uplink information to this interrogator. The tag or tags respond when the interrogator makes an inquiry as to what tags are within its radiation pattern or the interrogator asks a specific tag for a limited amount of information. In a second illustration of the operation of this first mode, the interrogator indicates as part of the downlink sync that it wishes to send a limited amount of information to one or more tags. This information is transmitted in the interval prior to the next downlink sync burst. The tag or tags respond in the second illustrative operation with a burst of upling information to verify receipt of the information from the interrogator.

The second mode of operation allows transfer of a large amount of information either in the uplink or the downlink communications and signals to any new tags which enter the radio field during the data transfer that they are not to participate in the communication. Large data transfers occur over multiple downlink sync periods, as appropriate, in this mode of operation. It is important that sync be uniquely identified from the flow of data in order to maintain uninterrupted communication between the interrogator and the selected tag or tags. This is accomplished by having a unique modulation period for the sync pulses which are distinct from either control or data pulses, as described later herein in detail with reference to FIG. 4. All tags in the system, whether they are participating in a communication or not, will recognize the sync pulses, and the control pulses that follow, and respond to the downlink sync, as appropriate. Specifically, if these tags are not part of the conversation, they stay out of it; if they are part of the conversation, they continue to participate. Finally, if a new communication is initiated, these tags respond as directed by the downlink sync and control signals.

The interrogator automatically determines the quantity of data and the correct mode in which to operate. Either mode can be initiated on successive communication periods by the communication protocol. The data transfer may occur either from the interrogator to a tag or multiple tags, or from a selected tag or multiple tags to the interrogator. The protocol allows either mode to be executed interchangeably. The interrogator transmits a downlink sync signal, from the interrogator to the tag, at regular intervals with a portion of this sync signal being used to control the subsequent data transfer mode.

Figure 2:
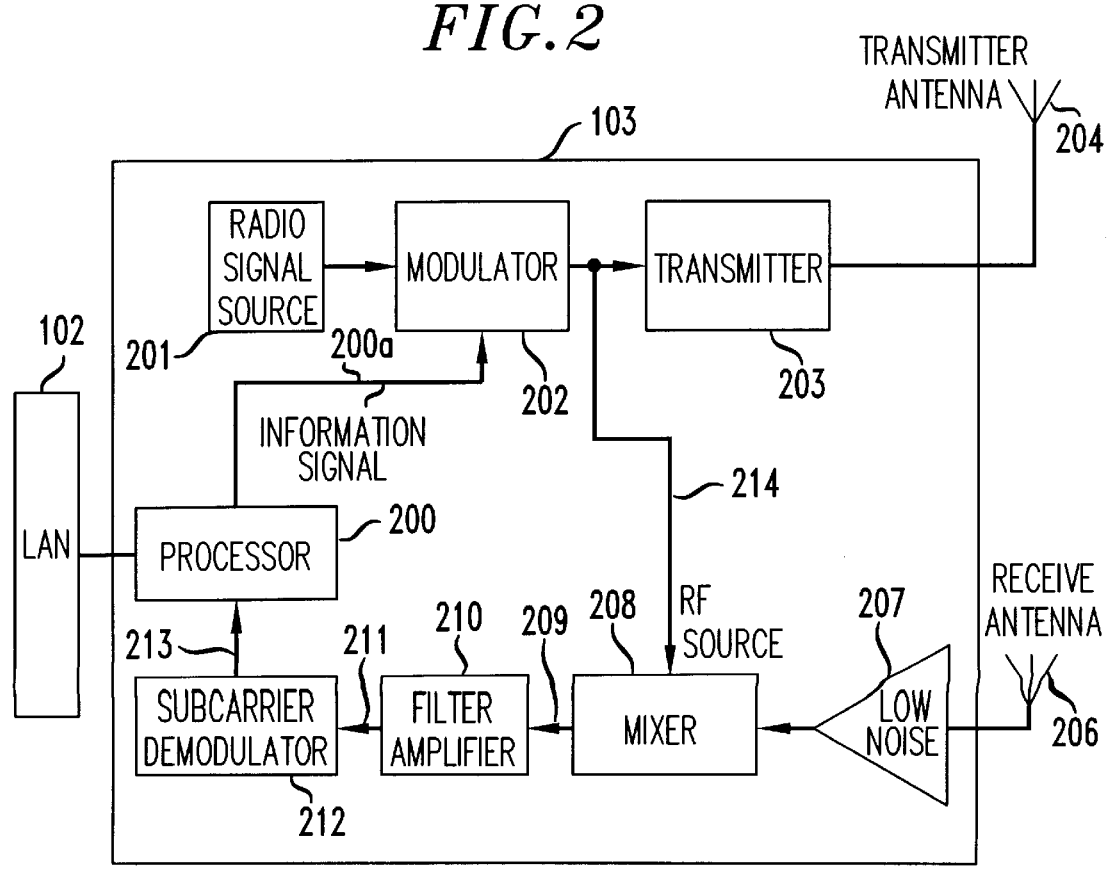
FIG. 2 is a block diagram of an illustrative interrogator unit used in the radio frequency identification system of FIG. 1.

FIG. 2 is a block diagram of an illustrative interrogator unit used in the radio frequency identification system of FIG. 1. With joint reference next to both FIGS. 1 and 2, a radio signal source 201 generates a radio signal, the modulator 202 modulates a information signal 200a onto the radio signal, and a transmitter 203 sends this modulated signal via an antenna 204, illustratively using amplitude modulation, to a tag. Amplitude modulation is a common choice since a tag can demodulate such a signal with a single, inexpensive nonlinear device (such as a diode).

Figure 3:
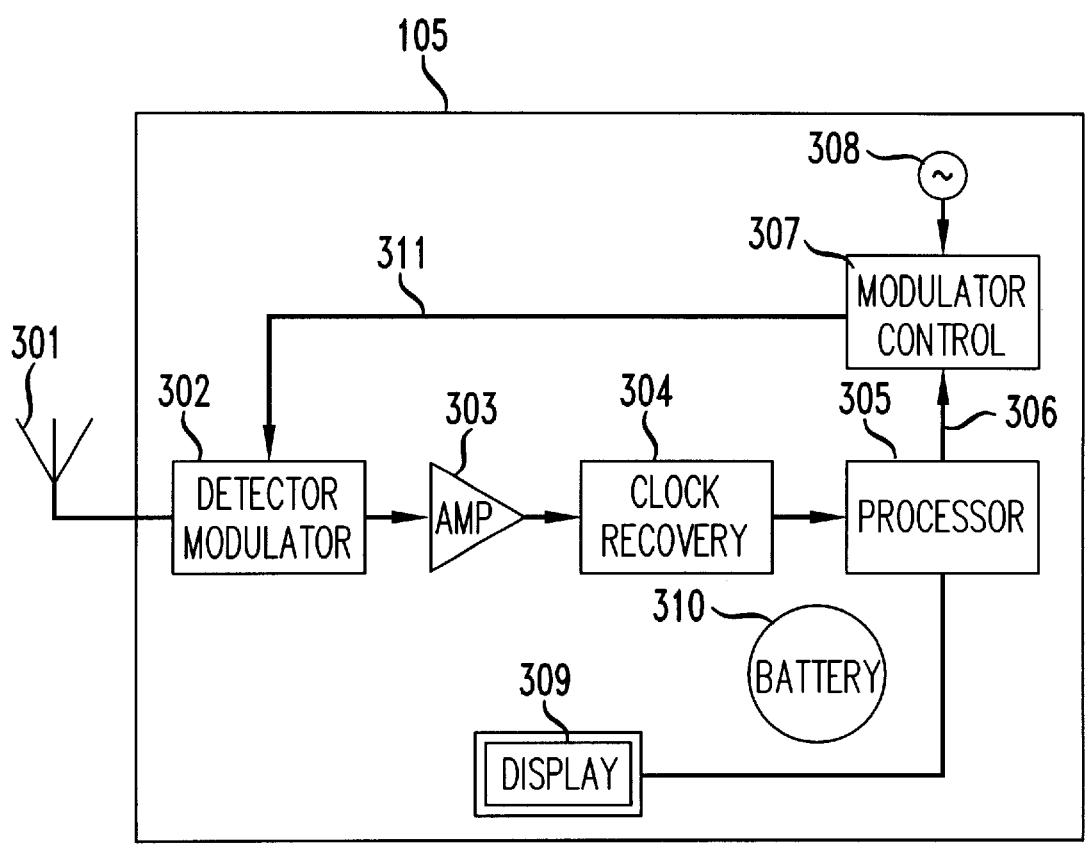
FIG. 3 shows a block diagram of a tag unit used in the radio frequency identification system of FIG. 1, in accordance with the invention.

FIG. 3 shows a block diagram of a tag unit usable in the radio frequency identification system of FIG. 1, in accordance with the disclosed embodiment of the invention. In the tag 105, the antenna 301 (frequently a loop or patch antenna) receives a modulated signal from one of the plurality of interrogators 103 or 104. This modulated signal is demodulated, directly to baseband, using a detector/modulator 302, which, illustratively, could be a single Schottky diode. The diode is appropriately biased with a proper current level in order to match the impedance of the diode and the antenna 301 so that losses of the radio signal are minimized. After the incoming signal is demodulated directly to baseband by the detector/modulator 302, the information signal is then amplified, by amplifier 303, and synchronization recovered in a clock and frame recovery circuit 304. The resulting information is sent to a processor 305. The processor 305 is typically an inexpensive 4- or 8-bit microprocessor. The clock and frame recovery circuit 304 can easily be implemented in an ASIC (Application Specific Integrated Circuit) which works together with processor 305.

The processor 305 generates an information signal 306 to be sent from the tag 105 back to the interrogator (e.g., 103). This information signal 306 (under control of the clock and frame recovery circuit 304) is sent to a modulator control circuit 307, which uses the information signal 306 to modulate a subcarrier frequency generated by the subcacrier frequency source 308. The frequency source 308 may be a crystal oscillator separate from the processor 305, or it may be a frequency source derived from signals present inside the processor 305—such as a divisor of the primary clock frequency of the processor. The modulated subcarrier signal 311 is used by detector/modulator 302 to modulate the radio carrier signal received from tag 105 to produce a modulated backscatter (e.g., reflected) signal. This is accomplished by switching on and off the Schottky diode using the modulated subcarrier signal 311, thereby changing the reflectance of antenna 301. A battery 310 or other power supply provides power to the circuitry of tag 105.

The communication link of the RFID system is based upon the principle of modulated back scatter (MBS). There are a variety of techniques for using MBS to send information from the tag to the interrogator. In some MBS technologies, the modulator control circuit 307 of the tag 105, shown in FIG. 3, for example, generates an amplitude modulated signal modulated at an Information Signal 306 frequency $f_2$. If the radio signal source 201, shown in FIG. 2, generates a CW frequency $f_c$, then the interrogator receives signals $f_c$ whose bandwidth is $2f_2$ and filters signals outside of this bandwidth range. This approach could be termed the "MBS at baseband" approach. Another approach would be for the tag 105 to generate a subcarrier frequency $f_s$, generated by frequency source 308, as shown in FIG. 3. The information could be conveyed using AM, FSK or Phase Shift Keying (PSK) by modulating the subcarrier frequency $f_s$ of frequency source 308 with the Information Signal $f_2$ from the processor 306. The interrogator 103 receives signals $f_c$, whose bandwidth is $2f_2$ but at a frequency $f_s$ away from $f_c$. This method is termed "MBS of a subcarrier". In Binary PSK (BPSK) systems, the phase of the subcarrier transitions nominally between 0 and 180 degrees.

Returning once again to FIG. 2, the interrogator 103 receives the reflected and modulated signal with the receive antenna 206, amplifies the signal with a low noise amplifier 207, and demodulates the signal using homodyne detection in a mixer 208 down to the intermiate frequency (IF) of the single subcarrier $f_s$. In some interrogator designs, a single transmitter 204 and receive 206 antenna is used. In this event, an electronic method of separating the transmitted signal from that received by the receiver chain is needed. This could be accomplished by a device such as a circulator. Using the same radio signal source 201 as used in the transmit chain means the demodulation to IF is done using homodyne detection. This has advantages in that it greatly reduces phase noise in the receiver circuits. The mixer 208 sends a demodulated signal 209—if using a quadrature mixer, it sends both I (in phase) and Q (quadrature) signals—into filter/amplifier 210 to properly filter the demodulated signal 209. The resulting filtered signal—then typically an information signal 211 carried on an IF subcarrier—is demodulated from the subcarrier in the subcarrier demodulator 212, which sends the information signal 213 to processor 200 to determine the content of the message. The I and Q channels of Signal 209 can be combined in the filter/amplifier 210, or in the subcarrier demodulator 212, or they could be combined in the processor 200.

Referring next to FIG. 4, there is shown a timing diagram for illustrating the operation of the communication protocol in providing communications between an interrogator and the tags in the RFID system, in accordance with the disclosed embodiment of the invention. The RFID system communication is based upon a synchronous technique known as "slotted aloha". The timing for this system is geared towards being able to read multiple tags passing through the interrogator field at speeds up to 10 meters per second (m/s), and an accuracy for two tags of 99.99%. Any tag in the interrogator transmit field can detect and synchronize to the down link pulses. As illustrated in FIG. 4, a downlink cycle mini-frame 610 is shown as a 64 millisecond (ms) period, subdivided into eight 8 ms time slots.

Three mini-frames (downlink cycles 630, 640 and 650) combine to form a 192 ms "up link" flame or cycle 620. In the first slot 660 of the mini-frame, a burst of 16 or so 2 KHz pulses is modulated onto the RF carrier by the interrogator for "down link" synchronization. These down link pulses in this first slot 660 are divided into a preamble group 662 and a control group 664. The duty cycle of the pulses in the preamble group 662 is "X", where X typically may be 50%. The duty cycle of the pulses in the control group is "Y", where Y typically may be 75%. This duty cycle of Y is maintained for any subsequent downlink data which may be sent from the interrogator to the tags in the radio field of the interrogator. Consequently, any tag randomly entering the radio field of the interrogator may see a modulated carrier signal, but since the duty cycle of the downlink data is different from that of the synchronization burst, the tag will not confuse this data pattern with the preamble or synchronization signal from the interrogator. This approach allows relatively short sync intervals (64 ms) as opposed to requiring a search for a long packet header by those tags entering the field of interrogation of the interrogator.

FIG. 5 shows a timing diagram for illustrating the operation of the communication protocol and the format of the message in providing communications between an interrogator and the tags in the RFID system, in accordance with the disclosed embodiment of the invention. Since multiple tags may enter the interrogator field at any given time, the format of the message in "the down link sync timing" is provided by the interrogator in a format shown in FIG. 5. The tags individually synchronize onto the periodic down link sync pulses. Each tag with a short message for the interrogator responds by randomly transmitting in 6 of the 21 available slots in the uplink cycle, shown in FIG. 4. Each tag's response is less than one time slot in duration (8 ms), and synchronized to the down link cycle. The format of the message from each tag is similar to that shown in FIG. 5, except that the Tag ID, Length, Message and error correction code (crc) are less than 8 ms in length.

Once the interrogator has ascertained the presence of a particular tag in its field with which it wishes to communicate or wishes to broadcast a message to any tag in the field, a short message from the interrogator is communicated to the tags. In this short message, the down link sync control bits instructs all tags to be quiet and listen for the message to follow. This message has the format shown in FIG. 5, but may be shorter than the 192 ms uplink cycle period. Also, any tags entering the field during the transmission of the message will not see the 8 bit preamble, will not acquire sync until after the message is complete, and thus will not attempt to communicate with the interrogator or be able to receive this particular message. The downlink message from the interrogator will identify the tag with which it wishes to communicate. If one tag is selected, it acknowledges prior to the next downlink sync time slot.

Once the interrogator has ascerained the presence of a particular tag in its field with which it wishes to communicate, a long message from the tag may be communicated to the interrogator. The down link sync control bits from the interrogator informs all tags to be quiet and listen for the message to follow. This message has the format shown in FIG. 5, but may be shorter than the 192 ms uplink cycle period. Also, any tags entering the field during the transmission of the message will not see the 8 bit preamble, will not acquire sync until after the message is complete, and will not attempt to communicate with the interrogator. The downlink message identifies the tag which is to respond and what information the interrogator is requesting. The designated tag acknowledges receipt of this information prior to the next downlink sync time slot and the designated tag begins transmission of its data. The tag data is sent in the format shown in FIG. 5 for downlink information, but is limited to fit within the 64 ms downlink cycle period. If the message is longer than 56 ms (64–8 for down link sync), it is sent during subsequent intervals until completed. The interrogator reassembles the complete message from the tag. With this approach, the interrogator transmits downlink sync signals on a 64 ms period to a) acknowledge receipt of the data, b) informs other tags to remain silent, and c) informs the designated tag to stop transmitting.

Once the interrogator has verified the presence of one or more tags with which it wishes to communicate, it may then transmit a long message to each tag. Using the format of FIG. 5, messages are sent in the 192 ms interval with tag acknowledgment prior to the next downlink sync. While communicating with a tag in this mode, a communication to the other tags causes these tags to remain silent so that they do not corrupt the data transfer in progress. The downlink message extends through as many intervals as are required for its completion.

What has been described is merely illustrative of the application of the principles of the present invention. Other arrangements, time intervals, and methods can be implemented by those skilled in the art without departing from the spirit and scope of the present invention.

We claim:

1. A radio frequency identification system comprising:
   at least one interrogator unit for transmitting an interrogation signal, said interrogator unit being configurable for transmitting said interrogation signal in a first and a second mode;
   a plurality of identification tags for receiving said interrogation signal, each one of the plurality of identification tags being responsive to said interrogator unit while said unit is operating in said first or said second mode; and
   means in said interrogator unit for selectively communicating with an identified one of said plurality of identification tags while operating in said first or said second mode.

2. The radio frequency identification system of claim 1 wherein said interrogator unit, while configured in said first mode, includes means for rapidly transmitting a limited amount of data, and while configured in said second mode, includes means for transmitting a large quantity of data, the data transmitted by the interrogator unit while configured in the second mode being greater than the data being transmitted while configured in the first mode.

3. The radio frequency identification system of claim 2 wherein said identified one of said plurality of identification tags, responsive to said interrogator unit being configured in said first mode, includes means for rapidly transmitting a limited amount of data, and responsive to said interrogator unit being configured in said second mode, includes means for transmitting a large quantity of data, the data transmitted by the identified one of said plurality of identification tags while said interrogator is configured in said second mode being greater than the data being transmitted while said interrogator is configured in the first mode.

4. The radio frequency identification system of claim 1 wherein said selective communicating means includes means in said interrogator unit for transmitting a control signal to other of the plurality of identification tags for preventing said tags from responding to said interrogator unit while said unit is communicating with the identified one of the plurality of identification tags.

5. The radio frequency identification system of claim 4 wherein said selective communicating means further includes means for providing a synchronizing signal for said plurality of identification tags, and wherein said synchronization signal includes a first set of pulses in a preamble group and a second set of pulses in a control group.

6. The radio frequency identification system of claim 5 wherein said first set of pulses in said preamble group has a duty cycle with a first duration and said second set of pulses in said control group has a duty cycle with a second duration different from said first duration.

7. The radio frequency identification system of claim 6 wherein said selective communicating means further includes means for providing a third set of pulses in a data group, said third set of pulses in said data group having a duty cycle with said second duration.

8. The radio frequency identification system of claim 6 wherein said duty cycle of said second set of pulses with said second duration is longer than the duty cycle of said first set of pulses with said first duration.

9. The radio frequency identification system of claim 6 wherein the plurality of identification tags communicate with the at least one interrogator unit with a back scatter signal.

10. A method of communicating between an interrogator unit and a plurality of identification tags in a radio frequency identification system, the method comprising the steps of:
    transmitting an interrogation signal from the interrogator unit, said interrogator unit being configurable for transmitting said interrogation signal in a first and a second mode;
    receiving said interrogation signal in each one of the plurality of identification tags, each one of said plurality of identification tags being responsive to said interrogator unit while said unit is operating in either said first or said second mode; and
    selectively communicating by said interrogator unit with an identified one of said plurality of identification tags while operating in said first or said second mode.

11. The method of claim 10 further comprising the steps of configuring said interrogator unit in said first mode for rapidly transmitting a limited amount of data, and configuring said interrogator unit in said second mode for transmitting a large quantity of data, the data transmitted by the interrogator unit while configured in the second mode being greater than the data being transmitted while configured in the first mode.

12. The method of claim 10 further comprising the step of configuring said interrogator unit for transmitting a control signal to other of the plurality of identification tags for preventing said tags from responding to said interrogator unit while said unit is communicating with the identified one of the plurality of identification tags.

13. The method of claim 12 further comprising the step of providing a synchronizing signal for said plurality of identification tags, and wherein said synchronization signal includes a first set of pulses in a preamble group and a second set of pulses in a control group.

14. The method of claim 13 wherein said first set of pulses in said preamble group has a duty cycle with a first duration and said second set of pulses in said control group has a duty cycle with a second duration different from said first duration.

15. The method of claim 14 further comprising the step of providing a third set of pulses in a data group, said third set of pulses in said data group having a duty cycle with said second duration.

* * * * *